United States Patent
Laqua

(10) Patent No.: US 6,204,442 B1
(45) Date of Patent: Mar. 20, 2001

(54) THERMOPHOTOVOLTAIC GENERATOR

(75) Inventor: Ekkehard Laqua, Oberhausen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/319,346

(22) PCT Filed: Sep. 29, 1998

(86) PCT No.: PCT/DE98/02875

§ 371 Date: Jan. 18, 2000

§ 102(e) Date: Jan. 18, 2000

(87) PCT Pub. No.: WO99/17378

PCT Pub. Date: Apr. 8, 1999

(30) Foreign Application Priority Data

Sep. 30, 1997 (DE) ............................................. 197 43 356

(51) Int. Cl.⁷ .......................... H01L 31/04; H01L 31/058
(52) U.S. Cl. .................. 136/253; 136/246; 431/253; 431/328; 431/100
(58) Field of Search .................................. 136/253, 246; 431/253, 328, 100

(56) References Cited

U.S. PATENT DOCUMENTS

| | | | |
|---|---|---|---|
| 4,707,560 | * 11/1987 | Hottel et al. ........................ | 136/253 |
| 5,044,939 | * 9/1991 | Dehlsen ............................... | 136/253 |
| 5,356,487 | * 10/1994 | Goldstein et al. ................... | 136/253 |
| 5,383,976 | * 1/1995 | Fraas et al. .......................... | 136/253 |
| 5,772,793 | * 6/1998 | Ashcroft et al. ..................... | 136/253 |
| 5,942,047 | * 8/1999 | Fraas et al. .......................... | 136/253 |

FOREIGN PATENT DOCUMENTS 198 15 094 * 10/1999 (DE) .

OTHER PUBLICATIONS

D. Burger et al., "Low–Bandgap Thermophotovoltaic System Design", Aug. 8, 1993, Aerospace Power, Conversion Technology, Electrochemical Conversion, Atlanta, Aug. 8–13, 1993, vol. 1, Nr. Conf. 28, Institute of Electrical and Electronics Engineers, pp. 1.1045–1.1049.

Burger et al, "Low–Bandgap Thermophotovoltaic System Design," Aerospace Power, Conversion Technology, Electrochemical Conversion, Atlanta, Aug. 1993, pp. 1.1045–1.1049.*

* cited by examiner

Primary Examiner—Alan Diamond
(74) Attorney, Agent, or Firm—Kenyon & Kenyon

(57) ABSTRACT

A thermophotovoltaic generator having a solid body located in a combustion chamber of a burner, with the surface of the solid body being excited to a state of radiation by an air-fuel mixture that is supplied by a delivery unit to the burner, where it combusts, and the radiation strikes a photocell, which then generates electrical energy; and having an exhaust pipe discharging the hot combustion gases from the combustion chamber. A premixing chamber is closed from the combustion chamber to the outside by a porous solid body, the photocell is positioned opposite the porous solid body and upstream from the latter in the premixing chamber, a reflector is located downstream from the solid body and opposite the latter outside the premixing chamber so that it reflects the radiation produced by the combustion of the air-fuel mixture on the solid body in the opposite direction from the combustion gases flowing to the photocell, and the air-fuel mixture is delivered by the delivery unit to the premixing chamber so that the non-combusted air-fuel mixture flows around the photocell from behind, thus cooling it.

4 Claims, 2 Drawing Sheets

THERMOPHOTOVOLTAIC GENERATOR

FIELD OF THE INVENTION

The present invention relates to a thermophotovoltaic generator having a solid body, located in a combustion chamber, whose surface is excited to a state of radiation by a combusting air-fuel mixture delivered to the combustion chamber by a delivery unit, with the radiation striking a photocell which then generates electrical energy; and also having an exhaust pipe which conducts the hot combustion gases away from the combustion chamber.

BACKGROUND INFORMATION

The fuel supply systems of radiant burners are currently designed so that the fuel is supplied to the solid body from the inside or from behind, is burned on the surface of the solid body, and excites the latter to a state of radiation. The resulting combustion gases are discharged to the outside through the exhaust pipe. One example of this is the known solid bed burner.

The use of a radiant burner of this type in a thermophotovoltaic generator currently causes problems in that the hot combustion gases flow to the photocell. For this reason, it is necessary to take protective action such as cooling the photocell and shielding it with a pane of quartz glass to prevent the photocell from overheating.

SUMMARY OF THE INVENTION

The object of the present invention is to design a thermophotovoltaic generator that uses a radiant burner so that the photocells used to generate power are not located in the direction of hot combustion gas flow, as is usually the case at present, thus making it possible to greatly reduce the cost of the measures currently needed to protect the photocell against the hot combustion gases.

To achieve this object, a thermophotovoltaic generator according to the present invention is provided in which a premixing chamber is closed to the outside by a porous solid body. A photocell is positioned opposite the solid body and upstream from the latter in the premixing chamber. A reflector is located downstream from the solid body and opposite the latter outside the premixing chamber so that it reflects the radiation produced by the combustion of the air-fuel mixture on the solid body back to the solid body in the direction opposite the flow of the combustion gases. The air-fuel mixture is delivered to the premixing chamber by the delivery unit so that the non-combusted air-fuel mixture flows onto and around the photocell from behind, thus cooling it.

The present invention is based on reversing the direction of fuel flow and the direction of radiation. As a result, the photocell does not come into contact with hot combustion gases, but instead is actively cooled by the cold air-fuel mixture flowing around it. This makes it possible to considerably reduce the cost of protecting the photocell against the hot combustion gases.

According to one embodiment of the thermophotovoltaic generator, the photocell and the reflector can be constructed as flat parts and arranged on parallel planes.

In an alternative embodiment, a largely cylindrical combustion chamber can be provided, with the photocell and reflector positioned on lateral cylinder surfaces that are arranged coaxially to one another.

In this case, it is advantageous to position the photocells on an inner cylinder surface and the reflector on an outer cylinder surface surrounding the inner cylinder surface. Between them, in the equally cylindrical combustion chamber, is then located the porous solid body, which, except for its porosity, can be completely closed off.

The thermophotovoltaic generator according to the present invention, in which the photocell is cooled by the air-fuel mixture flowing to it, can be implemented in a variety of embodiments, for example in a radial, axial, or other geometrical arrangement.

DETAILED DESCRIPTION

Figure 1:
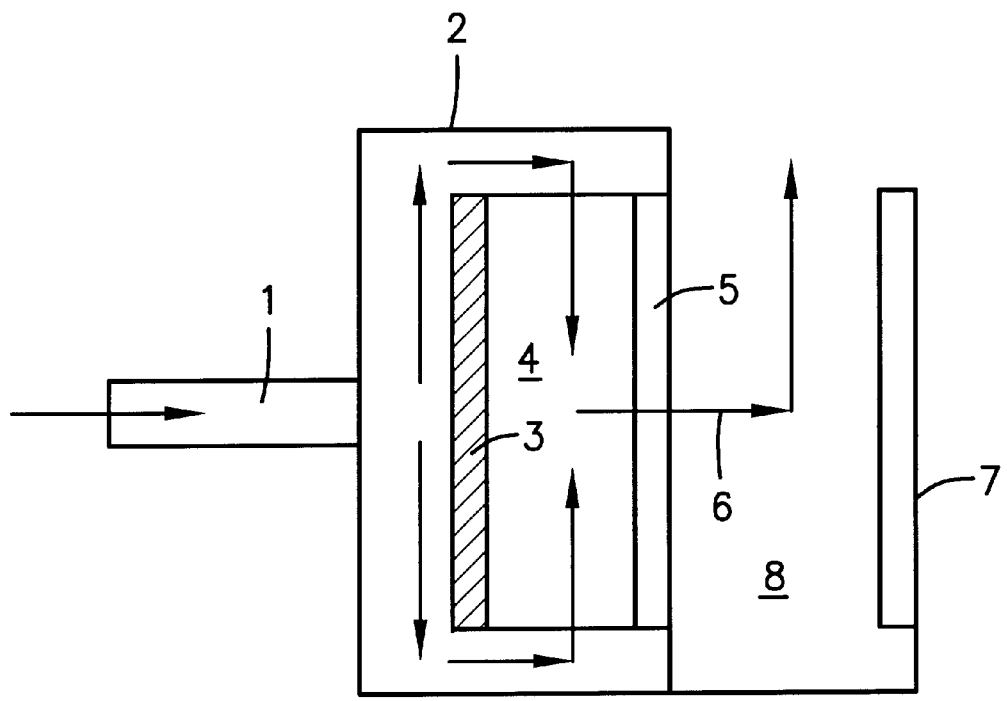
FIG. 1 shows a diagram of a thermophotovoltaic generator according to the present invention.

FIG. 1 shows a schematic diagram of a thermophotovoltaic generator according to the present invention in which the hot combustion gases represented by solid arrow lines 6 are not directed onto photocell 3. In addition, photocell 3 is cooled by the air-fuel mixture flowing into premixing chamber 4 of burner 2 via a delivery unit 1. Hot combustion gases 6 flow from premixing chamber 4 onto and through the surface of porous solid body 5. There, the fuel burns and excites porous solid body 5 to a state of radiation. Hot combustion gases 6 leave porous solid body 5 and are discharged from combustion chamber 8 through an exhaust pipe. A reflector 7, which reflects the radiation in the direction of the photocell so that the radiation is effectively directed only in the direction of the photocell, is attached parallel to photocell 3 and also to porous solid body 5.

The advantage of this arrangement of the thermophotovoltaic generator according to the present invention is that hot combustion gases 6 and the radiation propagate in opposite directions and the radiation is reflected to photocell 3 by porous solid body 5 and by reflector 7.

Figure 2A:
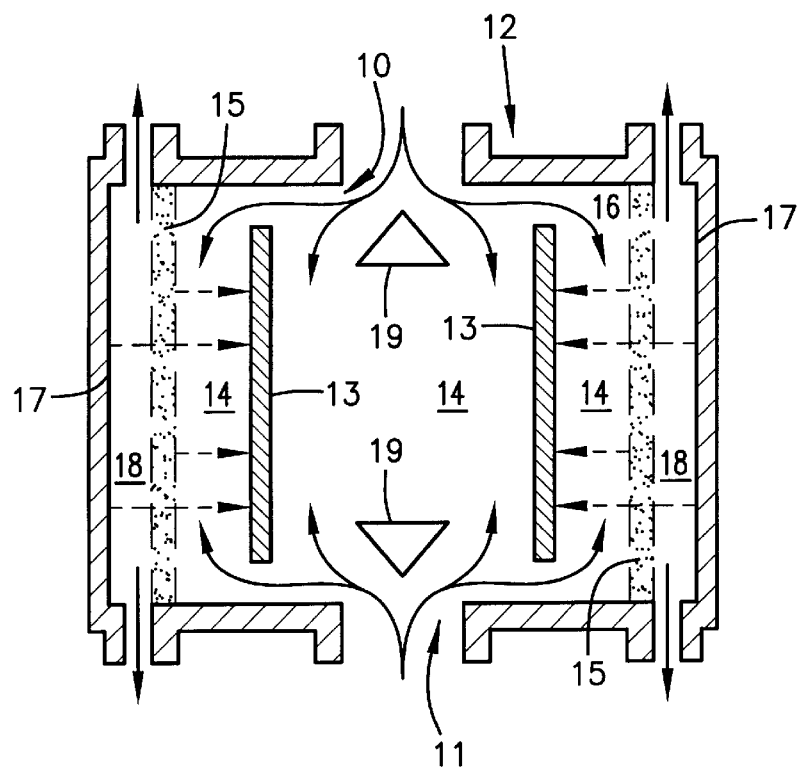
FIG. 2A shows a top view of a schematic cross-sectional representation of the exemplary embodiment of the thermophotovoltaic generator with a radial arrangement of a photocell and a reflector.
Figure 2B:
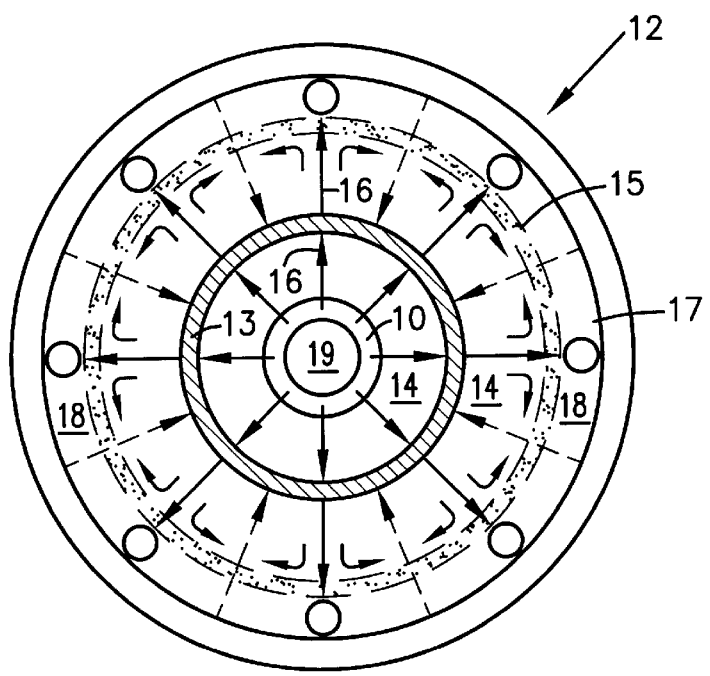
FIG. 2B shows a side view of the schematic cross-sectional representation of the thermophotovoltaic generator illustrated in FIG. 2A.

FIGS. 2A and 2B show a thermophotovoltaic generator according to the present invention in which photocell 13, porous solid body 15, and reflector 17 are positioned radially to each other, i.e. they are located on lateral cylinder surfaces that are concentric to one another. FIG. 2A shows a thermophotovoltaic generator arrangement of this type with a largely cylindrical burner 12. Inside a premixing chamber 14 of this burner, the air-fuel mixture supplied by a delivery unit 10, 11 flows around a cylindrically arranged photocell 13 and cools it. Conical distribution devices 19 can be provided in the path of the inflowing air-fuel mixture in premixing chamber 14 to distribute the air-fuel mixture. Following combustion in a combustion chamber 18, air-fuel mixture 16 burning on the surface of porous solid body 15 is discharged through exhaust openings in the form of combustion gases. Reflector 17 is also arranged cylindrically and concentrically around photocell 13 and porous solid body 15. The radiation produced during combustion on the solid body, as well as a portion of the radiation reflected by reflector 17 (shown as broken arrow lines), strike photocell 13. The main portion of the reflected radiation maintains the temperature of the solid body.

The radial arrangement illustrated in FIGS. 2A and 2B can undergo a number of flow-optimizing variations. It is also possible to provide a geometric arrangement that provides better cooling of the photocell in which the order of photocell 13, porous solid body 15, and reflector 17 is reversed, with reflector 17 positioned internally and the photocell externally. The air-fuel mixture supply and the discharge of exhaust gases 18 would also have to be reversed in this case.

In addition to the cylindrical arrangement illustrated in FIGS. 2A and 2B, other arrangements of a thermophotovoltaic generator based on the principle according to the present invention of reversing the direction of fuel supply and radiation flow are also possible, such as conical or spherical arrangements.

What is claimed is:

1. A thermophotovoltaic generator, comprising:

a burner including a combustion chamber and a premixing chamber;

a delivery unit supplying an air-fuel mixture to the premixing chamber of the burner;

a porous solid body situated in the combustion chamber and having a surface which is excited to a state of radiation by the air-fuel mixture, the porous solid body closing the premixing chamber from the combustion chamber and an external environment;

a photocell situated opposite to the porous solid body and upstream from the porous solid body in the premixing chamber, the air-fuel mixture being combusted at the surface of the solid body so that the radiation strikes the photocell to generate electrical energy;

an exhaust pipe discharging hot combustion gases from the combustion chamber;

a reflector situated downstream from the porous solid body and opposite the porous solid body outside of the premixing chamber, the reflector reflecting the radiation to the photocell in a direction which is opposite from a flow of the hot combustion gases, wherein the delivery unit supplies the air-fuel mixture to the premixing chamber so that a non-combusted portion of the air-fuel mixture flows onto and around the photocell from a back portion thereof to cool the photocell.

2. The thermophotovoltaic generator according to claim 1, wherein the photocell is situated in a first plane, and the reflector is situated in a second plane, the first and second planes being parallel to one another.

3. The thermophotovoltaic generator according to claim 1, wherein the burner has a substantially cylindrical shape, and wherein the photocell, the porous solid body and the reflector are situated on lateral cylinder surfaces of the burner, coaxially with respect to one another.

4. The thermophotovoltaic generator according to claim 3, wherein the reflector has a cylindrical shape, and wherein the photocell is attached to an inner lateral cylinder surface relative to the reflector.

* * * * *